Jan. 15, 1946.  A. L. McGREGOR  2,392,938
CHILD'S VEHICLE
Filed June 22 1944
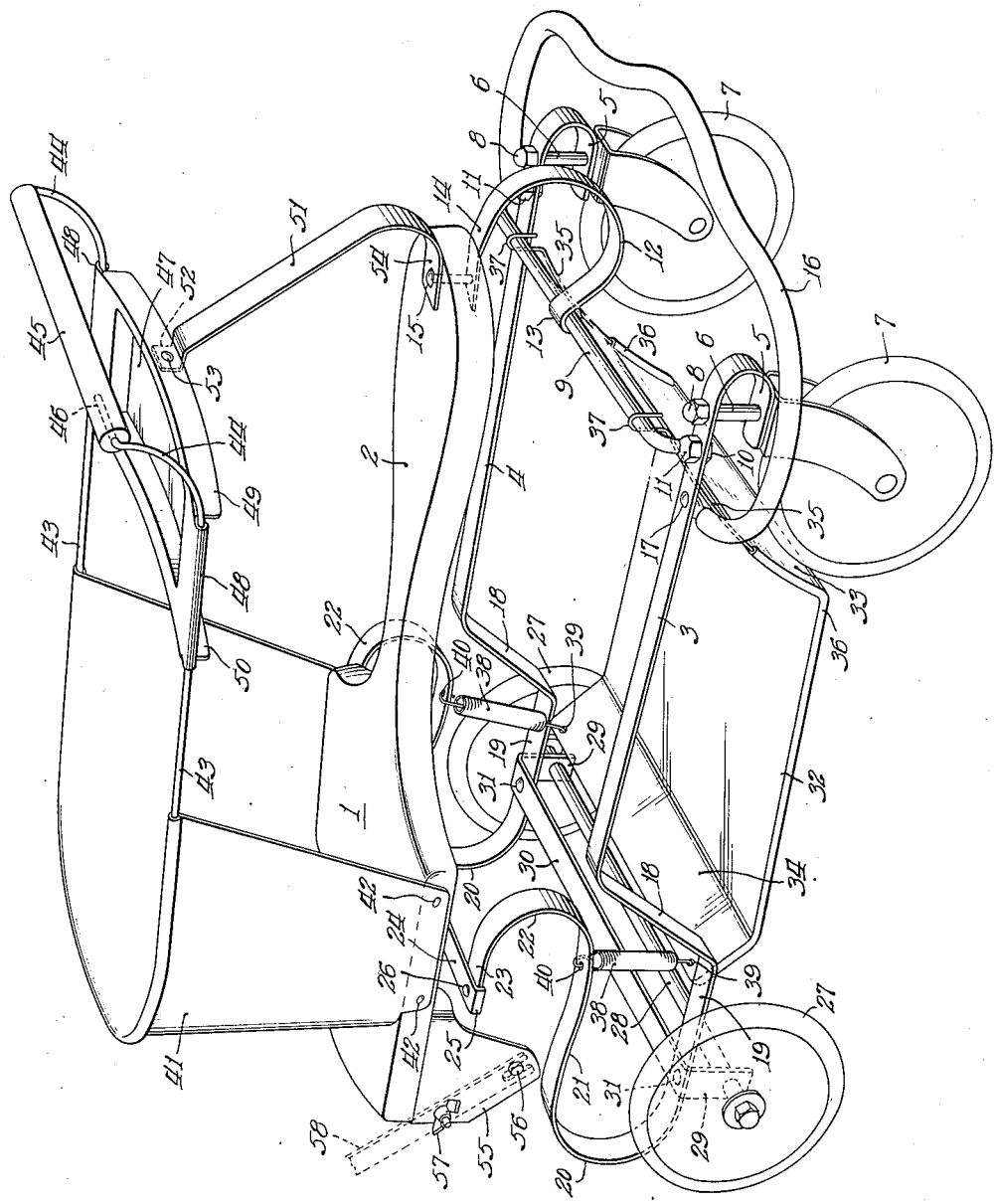
Inventor:
Allan L. McGregor
By: Evans, Pond & Anderson
Attys.

Patented Jan. 15, 1946

2,392,938

UNITED STATES PATENT OFFICE 2,392,938

CHILD'S VEHICLE

Allan L. McGregor, Chicago, Ill.

Application June 22, 1944, Serial No. 541,527

12 Claims. (Cl. 280—47)

This invention relates to a child's vehicle of the type which is sometimes called a "stroller" or "baby walker," the vehicle being of such form that a young child not yet able to walk alone may, with the aid of the vehicle, propel itself from place to place without other aid. The vehicle is also of such form that it is adapted to serve as a means for transporting a young child in place of the conventional stroller.

The main objects of the invention are to provide a simple, rigid and durable but light-weight and easily operable vehicle of the character indicated, and one which may be manufactured and sold economically and at low cost.

Other objects and advantages of the invention will be understood by reference to the following specification and accompanying drawing, wherein there is illustrated a child's vehicle embodying a selected form of the invention.

In the drawing, the figure is a perspective illustrating a selected form of a child's vehicle embodying the present invention.

The vehicle herein disclosed embodies a seat member 1 having a forwardly extending tongue-like extension 2. The seat member with its forward extension 2 may be made of wood, metal, or other suitable material including any suitable so-called plastic composition. In this instance, the seat structure and tongue are illustrated as being of wood construction.

The frame or chassis structure which supports the seat, embodies a pair of strap iron side frames 3 and 4. The front portions of said side frames 3 and 4 have downwardly and rearwardly turned end portions 5 which co-operate with the overlying portions of the respective frame members to rotatably receive the spindles 6 of suitable caster wheels 7. Accordingly, the downwardly and rearwardly bent front end portions 5 of the side frame, together with the overlying portions of the respective frames are provided with vertically aligned holes for receiving said caster spindles. Suitable nuts 8 threaded on the upper ends of the respective spindles serve to prevent the casters from dropping away from the side frames when the vehicle is lifted from the sidewalk or floor.

The front end portions of the side frames 3 and 4 are rigidly interconnected by means of a transversely extending rod 9 which has down-turned end portions passed through suitable holes in the respective frame members. The downturned end portions of the cross rod 9 may be threaded to receive nuts 10 and 11 on opposite sides of the respective frame members, to thereby securely attach the cross rod 9 to the frame members.

The front end portion of the seat structure is supported from the frame by means of a moderately resilient strap metal member 12 of open loop or U shaped form, one end of which is anchored to the cross bar 9 by being bent therearound, as shown at 13, and the other end 14 of which extends under the front end of the tongue 2 and is secured to the latter by means of a bolt, such as indicated at 15.

A suitable bumper 16 consisting of a bent metal rod covered with tubing, preferably of rubber material or other cushioning material, is provided and has its ends secured to the respective side frames 3 and 4, as indicated at 17.

The rearward portions of the side frames 3 and 4 embody downwardly and rearwardly bent leg portions 18, horizontal portions 19 which extend rearwardly from the lower ends of the legs 18, upwardly and forwardly curved rear loops or portions 20, forwardly extending more or less straight portions 21 approximately paralleling the horizontal lower portions 19, and upwardly and rearwardly curved loops or portions 22 which have free rear end portions 23 bolted or otherwise attached to the respectively adjacent ends of a cross member 24. The cross member 24 may consist of a strap metal member of suitable strength, the same being secured to the underside of the seat member by means of wood screws or otherwise. Said cross member 24 may be of more or less resilient strap metal, if preferred, and its ends are desirably bent downwardly as shown at 25, to co-operate with the fastening rivet or bolt 26 in rigidly securing the rear end portion 23 to the cross member 24.

The side frames 3 and 4 are thus rigidly interconnected at their rear ends. The forwardly and rearwardly turned loop portions 20 and 22 of the respective frame members co-operate to provide a desirable degree of resilient support for the seat structure. The rear portion of the vehicle is supported from the floor or sidewalk by means of a pair of wheels 27 which are rotatably supported on the outer ends of an axle 28. Said axle 28 is supported by being passed through the down-turned end portions 29 of a cross member 30 which extends over the horizontal frame portions 19 and is riveted or bolted thereto, as shown at 31.

When the vehicle is to be employed for the purpose of transporting a child over a considerable distance, it is often desired to prevent the child from dragging its feet on the sidewalk.

For this purpose, there is provided a platform 32. Said platform may be of sheet metal construction having a horizontally disposed main panel and upwardly extending front and rear portions 33 and 34. The side edges of the platform 32 and its front and rear extensions may be rolled around wires or metal rods, such as indicated at 35, to thereby form very rigid and reinforced side edges. The front portion of the platform may be suspended from the cross rod 9 by extensions of said wires or rods 35, which are provided with downwardly opening hooks 37, which are adapted to engage over the cross rod 9, as shown. The rear end of the platform may be similarly suspended or supported from the cross member 30, or from the overlying portions 21 of the respective frame members. In this instance, the rear end of the platform 32 is illustrated as being suspended by means of stretchable coil springs 38, which have their lower ends provided with hooks for engaging the rear end of the platform adjacent its opposite sides, and the overlying portions 21 of the respective frame members 3 and 4. Accordingly, the rear portion 34 of the platform is provided with suitable holes 39 for receiving the spring hooks and the frame portions 21 with suitable holes 40 for the same purpose. It will be seen that the platform 32 may be readily removed from the device by merely unhooking the front supporting hooks 37 from the cross rod 9, and by unhooking the springs 38 from the side frame portions 21.

For supporting a very young child on the seat of the vehicle, there is provided a back rest 41 which may be of sheet metal, or other suitable construction. Lower side portions of the back rest may extend downwardly so as to overlap the side edges of the seat 1, and are secured thereto by suitable means, such as screws or nails indicated at 42. The upper edge of the back rest 41 is preferably reinforced by being rolled around a wire or rod member 43, which is extended horizontally forwardly and then upwardly, as indicated at 44, to provide supports for a handle bar or rod 45. The upturned front portions 44 of the reinforcing rod 43 are provided with end portions, as indicated at 46, which are bent to extend into suitable holes provided in the handle bar 45.

A tray or shallow pan 47, preferably of sheet metal, is desirably provided, the same being supported by having end portions 48 rolled around the horizontal extensions of the reinforcing rod 43. Said tray 47 is also preferably provided with down-turned front and rear flanges 49 and 50 respectively, which serve to strengthen the tray so that the latter may constitute means for rigidly connecting the forward portions of the reinforcing rod 43, whereby the latter is enabled to serve the purpose of supporting a child on the seat 1.

A brace 51 has its upper end provided with an offset upward extension 52 disposed against the inside of the front flange 49 of the tray 47, and rigidly secured thereto by a bolt or rivet, as indicated at 53. The lower end of said brace 51 is provided with a rearwardly bent horizontal portion 54, which rests on the top of the front end portion of the tongue 2, and is secured thereto by the bolt 15, which also secures the supporting frame portion 14 to said tongue.

Vehicles of the type described are usually accompanied by a detachable handle adapted to be attached to the vehicle when it is to be used for transporting a child over a considerable distance. For the purpose of facilitating attachment of a suitable handle structure, there are provided a pair of bracket plates, such as indicated at 55, the same being respectively secured to the bottom of the offset side edge portions of the seat structure 1. Said bracket plates 55 depend from the seat intermediate the rear loop portions 20 of the side frames 3 and 4, and said brackets are provided with suitable means represented by a headed stud 56 and a wing nut and screw 57, for detachably securing thereto the arms, such as 58, of a suitable handle structure.

In the described structure, the provision of a pair of like side frame members 3 and 4, formed of suitable strap metal, provides a low cost but desirably resilient means for supporting the seat structure on the wheels of the vehicle. The side frames are spaced apart a distance in excess of the width of the widest or rear portion of the seat 1, so that great stability is imparted to the vehicle. Pivotal mounting of the casters 7 on the front ends of the frame members provides for free swiveling of the caster wheels, while at the same time affording a very inexpensive means for attaching the casters to the frame ends. The provision of spring suspension for both the front and rear ends of the seat structure avoids the transmission of severe forces to the supporting frame structure and the wheels of the vehicle, so that lighter weight construction may be employed without sacrificing durability.

Employment of the pan 47 for rigidly connecting the forward extensions of the back rest reinforcing rod 43 supplies an additional economy in the construction of the device, and eliminates the requirement of providing special means for securing the metal member 45 to the end portions 46 of the rod 43. The inclined position of the rod brace 51 is a substantial improvement over the usual vertical post in that it affords greater freedom of movement for the child while, nevertheless, supplying the required support for the forward portion of the tray and frame rod 43.

The described structure may be modified in many respects without departing from the principles involved therein.

I claim:

1. A vehicle of the class described comprising a seat, a pair of side frames respectively spaced outwardly from the sides of said seat and located below the plane thereof, means extending transversely of said side frames and rigidly connecting the front portions thereof, an open loop member having one end rockably secured to said transverse member and its other end secured to the front portion of said seat for supporting the front portion of said seat, spring means interconnecting the rear portion of said seat and the rear ends of said side members for resiliently supporting the rear portion of said seat on said side frame members, and wheels on said side frames.

2. A vehicle of the class described comprising a seat having a forwardly projecting tongue-like extension, a chassis for supporting said seat, said chassis comprising a pair of strap metal side frame members, the forward ends of said side frame members being rebent so as to provide vertically spaced, vertically aligned portions, a bar extending transversely between the forward portions of said side frame members and rigidly secured at its ends to said side frame members, thereby to rigidly connect the forward portions of the latter, rearward portions of said side frame members being bent to provide in each member oppositely facing open loop portions, a member extending transversely between and rigidly connected to the free ends of the upper open loops, said member extending transversely beneath and secured to said seat, an open loop strap member having one free end portion secured to the front end of the tongue-like extension of said seat, and its other end secured to said front transverse member, a member extending transversely of the lower portions of the lowermost loops of the rear end portions of said side members, said last mentioned member being rigidly secured adjacent its ends to the respective side frame members, and having end portions bent downwardly outside of said side frame members, an axle extending through said down-turned end portions, wheels rotatably mounted on the free ends of said axle, and a pair of casters having vertically extending spindles extending through said vertically spaced, vertically aligned front end frame portions.

3. A child's vehicle according to claim 2 wherein there is also provided a platform for receiving the feet of a child seated on the seat of the vehicle, the said platform comprising means for detachably engaging the front transverse connecting member, and coil springs resiliently connecting rear end portions of said platform with rearwardly disposed side frame portions spaced upwardly from the normal plane of said platform.

4. A vehicle according to claim 2 wherein the side frames are spaced outwardly from the sides of the seat, and wherein the transverse member which connects the free ends of the upper rear end loops projects beyond the sides of the seat for attachment at its ends to the free ends of said upper loop portions.

5. A vehicle of the class described comprising a seat, a wheeled chassis for supporting said seat, a sheet metal back rest, a reinforcing rod having rear portions disposed adjacent the upper edges of said back rest, upper marginal portions of said back rest being rolled outwardly and downwardly around the rearward portions of said reinforcing member, said reinforcing rod having portions extending forwardly from the respective sides of said back rest, a sheet metal tray disposed between said forwardly extended reinforcing rod portions and having end portions rolled around said forwardly extended rod portions to thereby rigidly interconnect said forwardly extended rod portions, and means connected to said tray and extending downwardly therefrom into engagement with a portion of said seat for supporting the front portion of said tray in predetermined vertically spaced relation to said seat.

6. A vehicle of the class described comprising a seat member having a forwardly extending tongue-like portion, a wheeled chassis for supporting said seat, a back rest extending transversely of a rearward portion of said seat and provided with forwardly extending side portions adjacent the side edges of said seat, said side portions being provided with downwardly extending portions overlapping the side edges of said seat and secured thereto, means for reinforcing the upper edge portions of said back rest and side portions, said means comprising metal rod members having rearward portions disposed adjacent the upper edges of said back rest side portions and about which rods the upper marginal portions of said back rest side portions are rolled, said reinforcing rods having portions extending forwardly from the respective back rest side portions, a sheet metal tray extending transversely between said forward extensions of said reinforcing rod portions and having end portions rolled around said rod extensions, whereby said tray is operative to maintain said reinforcing rod extensions in predetermined spaced relation, and a strap metal member extending between and having its opposite ends secured respectively to the front end of said seat tongue and the forward portion of said tray to thereby support said tray in predetermined vertically spaced relation to said tongue.

7. A vehicle according to claim 6 wherein the forward extensions of said reinforcing rods are extended forwardly and upwardly beyond the front of said tray and wherein there is provided a handle extending transversely between and mounted on the front free end portions of the extensions of said reinforcing rods.

8. A vehicle of the class described, comprising a seat and a wheeled chassis supporting said seat, said chassis comprising a pair of side frame members extending forwardly and rearwardly of the vehicle, said members having front, intermediate and rear portions, said intermediate portions extending downwardly from the normal planes of the front portions, and said rear portions being bent to provide resilient loops having lower legs extending from the lower ends of said downwardly extending intermediate portions and upper legs above the planes of said front portions, and said seat being mounted on said upper legs.

9. A vehicle of the class described, comprising a seat and a wheeled chassis supporting said seat, said chassis comprising a pair of side frame members extending forwardly and rearwardly of the vehicle, said members having front, intermediate and rear portions, said intermediate portions extending downwardly from the normal planes of the front portions, and said rear portions being bent to provide lower and upper open loops respectively facing forwardly and rearwardly, the lower legs of said lower loops extending rearwardly from the lower ends of said downwardly extending intermediate portions, and said seat being mounted on the upper legs of said upper loops.

10. A vehicle of the class described, comprising a seat and a chassis supporting said seat, said chassis comprising a pair of side frame members extending forwardly and rearwardly of the vehicle, said members having front, intermediate and rear portions, said intermediate portions extending downwardly from the normal planes of the front portions, and said rear portions being bent to provide resilient loops having lower legs extending from the lower ends of said downwardly extending intermediate portions and upper legs above the planes of said front portions, said seat being mounted on said upper legs, the front ends of said side members being rebent downwardly and rearwardly to provide rigidly interconnected, vertically aligned and vertically spaced portions, and wheels mounted on said chassis comprising caster wheels having their pivots rotatably supported in said vertically spaced portions.

11. A vehicle of the class described, comprising a seat, a wheeled chassis for supporting said seat, a sheet metal member embodying back rest and side guard portions extending upwardly from said seat, reinforcing rods having rear, intermediate and front portions, said rear portions being disposed adjacent the upper edges of said side guard portions and upper marginal portions of the latter being secured to said rear rod portions, a tray disposed between said intermediate rod portions and secured thereto so as to be thereby supported, said front rod portions being offset upwardly from the plane of said tray, and a handle secured to said front end rod portions above said plane.

12. A vehicle of the class described, comprising a seat, a wheeled chassis for supporting said seat, a member embodying back rest and side guard portions extending upwardly from said seat, reinforcing rods having rear and front portions, said rear portions being disposed adjacent the upper edges of said side guard portions and upper marginal portions of the latter being secured to said rear rod portions, said front portions being offset upwardly from the plane of the upper edges of said side guard portions, and a handle secured to said front end portions above said plane.

ALLAN L. McGREGOR.